(12) United States Patent
Lee et al.

(10) Patent No.: US 9,075,734 B2
(45) Date of Patent: Jul. 7, 2015

(54) METHOD FOR UPDATING BETWEENNESS CENTRALITY OF GRAPH

(75) Inventors: Min Joong Lee, Daejeon (KR); Jung Min Lee, Daejeon (KR); Jaimie Y. Park, Daejeon (KR); Ryan H. Choi, Daejeon (KR); Chin Wan Chung, Daejeon (KR)

(73) Assignee: Korean Advanced Institute of Science and Technology, Daejeon (KR)

( * ) Notice: Subject to any disclaimer, the term of this patent is extended or adjusted under 35 U.S.C. 154(b) by 392 days.

(21) Appl. No.: 13/566,313

(22) Filed: Aug. 3, 2012

(65) Prior Publication Data

US 2013/0339290 A1     Dec. 19, 2013

(30) Foreign Application Priority Data

Jun. 15, 2012  (KR) .................. 10-2012-0064528

(51) Int. Cl.
*G06F 17/10*     (2006.01)

(52) U.S. Cl.
CPC ...................................... *G06F 17/10* (2013.01)

(58) Field of Classification Search
None
See application file for complete search history.

(56) References Cited

U.S. PATENT DOCUMENTS

| | | | |
|---|---|---|---|
| 7,913,209 B1 * | 3/2011 | Wu et al. ..................... | 716/106 |
| 2008/0109730 A1 * | 5/2008 | Coffman et al. ............ | 715/733 |

OTHER PUBLICATIONS

Bader et al, "Approximating Betweenness Centrality", the 5th Workshop on Algorithms and Models for the Web-Graph (WAW2007), San Diego, CA, Dec. 11-12, 2007.*
Chen et al, "The Betweenness Centrality Game for Strategic Network Formations", Microsoft Research Technical Report, MSR-TR-2008-167, Nov. 2008.*
Perer et al, "Balancing Systematic and Flexible Exploration of Social Networks", IEEE Transactions on Visualization and Computer Graphics, vol. 12, No. 5, Sep./Oct. 2006.*
Duan et al, "Network synchronizability analysis: The theory of subgraphs and complementary graphs", Department of Electronic Engineering, City University of Hong Kong, Hong Kong, China, Available online: Dec. 17, 2007.*
Girvan et al, "Community structure in social and biological networks", State University of New Jersey—New Brunswick, Piscataway, NJ, PNAS, Jun. 11, 2002, vol. 99, No. 12, 7821-7826.*

(Continued)

*Primary Examiner* — Jeffrey A Gaffin
*Assistant Examiner* — Ilya Traktovenko
(74) *Attorney, Agent, or Firm* — Hamre, Schumann, Mueller & Larson, P.C.

(57) ABSTRACT

The present invention provides a method for updating betweenness centrality of a graph, which obtains the betweenness centrality of an unweighted graph, which is updated when edges are updated. First of all, the method is performed by obtaining a minimum union cycle (an MUC) of the updated graph, and extracting an MUC ($MUC_U$) containing a vertex, which is incident to the updated edge. And a first betweenness centrality due to the shortest paths in the $MUC_U$, and a second betweenness centrality due to the shortest paths, not included in the $MUC_U$, are calculated. And finally, a final betweenness centrality of the graph is obtained by adding the first and second betweenness centralities. By using the method, the search space and calculation cost can be remarkably reduced.

6 Claims, 12 Drawing Sheets

(a)

(b)

(56) References Cited

OTHER PUBLICATIONS

Tan et al, "A Parallel Algorithm for Computing Betweenness Centrality", Institute of Computing Technology,Chinese Academy of Science, Beijing, China, 2009 International Conference on Parallel Processing, 2009.*
J.M. Anthonisse, "The rush in a directed graph," Technical report, Stichting Mathematsich Centrum (1971) 12 pages.
D.A. Bader et al., "Approximating Betweenness Centrality," In Proceedings of the $5^{th}$ International Conference on Algorithms and Models for the Web-graph, WAW'07 (2007) p. 124-137.
D.A. Bader and K. Madduri, "Parallel Algorithms for Evaluating Centrality Indices in Real-world Networks," In Proceedings of the 2006 International Conference on Parallel Processing, ICPP '06 (2006), p. 539-550.
U. Brandes,"A Faster Algorithm for Betweenness Centrality," Journal of Mathematical Sociology, vol. 25 (2001), p. 163-177.
U. Brandes, "On Variants of Shortest-Path Betweenness Centrality and their Generic Computation," Social Networks, vol. 30 (2007) p. 136-145.
U. Brandes and C. Pich, "Centrality Estimation in Large Networks," International Journal of Bifurcation and Chaos, vol. 17 (2007) 30 pages.
A. del Sol et al., "Topology of small-world networks of protein-protein complex structures," Bioinformatics, vol. 21 (2005), p. 1311-1315.
E. Estrada et al., "Communicability Betweenness in Complex Networks," Physica A: Statistical Mechanics and its Applications, vol. 388 (2009), 32 pages.
L.C. Freeman, A Set of Measures of Centrality Based on Betweenness, Sociometry, vol. 40 (1977), p. 35-41.
L.C. Freeman et al., "Centrality in valued graphs: A measure of betweenness based on network flow," Social Networks, vol. 13 (1991), p. 141-154.
R. Geisberger et al., "Better Approximation of Betweenness Centrality," in J.I. Munro and D. Wagner, editors, Alenex (2008), p. 90-100.
A. Golynski and J.D. Horton, "A Polynomial Time Algorithm to Find the Minimal Cycle Basis of a Regular Matroid," located online at http://citeseerx.ist.psu.edu/viewdoc/summary?doi=10.1.1.21.266, (2001), 11 pages.
P. Holme, "Congestion and centrality in traffic flow on complex networks," Advances in Complex Systems, vol. 6 (2003), p. 163-176.

Jin et al., "A Novel Application of Parallel Betweenness Centrality to Power Grid Contingency Analysis," in IPDPS (2010), p. 1-7.
T. Kavitha et al., "A Faster Algorithm for Minimum Cycle Basis of Graphs," In ICALP (2004), p. 846-857.
E.D. Kolaczyk et al., "Group betweenness and co-betweenness: Inter-reltaed notions of coalition centrality," Social Networks, vol. 31 (2009), p. 190-203.
S. Lammer et al., "Scaling Laws in the Spatial Structure of Urban Road Networks," Physica A, vol. 363 (2006), p. 89-95.
J. Leskovec et al., "Graphs over Time: Densification Laws, Shrinking Diameters and Possible Explanations," ACM KDD '05 (2005), p, 177-187.
L. Leydesdorff, "Betweenness Centrality as an Indicator of the Interdisciplinarity of Scientific Journals," Journal of the American Society for Information Science and Technology, vol. 58 (2007), p. 1303-1319.
Y. Makarychev, "Simple Linear Time Approximation Algorithm for Betweenness," Technical Report (2009), 5 pages.
M.E.J. Newman, "A measure of betweenness centrality based on random walks," Social Networks, vol. 27 (2005), p. 39-54.
M.E.J. Newman and M. Girvan, "Finding and evaluating community structure in networks," Physical Review E. vol. 26 (2004), 16 pages.
J.W. Pinney and D.R. Westhead, "Betweenness-based decomposition methods for social and biological networks," In Interdisciplinary Statistics and Bioinformatics (2006), p. 87-90.
A. Tizghadam and A. Leon-Garcia, "Robust network planning in nonuniform traffic scenarios," Computer Communications, vol. 34 (2011), p. 1436-1449.
H. Wang et al., "Betweenness centrality in a weighted network," Physical Review E, vol. 77 (2008), 10 pages.
M.J. Lee et al., "QUBE: a Quick algorithm for Updating BEtweenness centrality," ACM Proceedings of the $21^{21}$ Annual Conference on World Wide Web, WWW'12 (2012) 12 pages.
Marian Boguna et al., "Models of social networks based on social distance attachment", Physical Review E 70,056122 (2004) 8 pages.
P. Erdos et al., "On random graphs, 1." 1959. Publicationes Mathematicae (Debrecen), 6: p. 290-297, 1959.
S. Leskovec et al., "Graph evolution: Densification and shrinking diameters." ACM Trans. Knowl. Discov. Data, 1(1): 2, 2007, 42 pages.
K. Norlen et al., "EVA: Extraction, Visualization and Analysis of the Telecommunications and Media Ownership Network", Aug. 2002, 26 pages.

* cited by examiner

FIG. 1
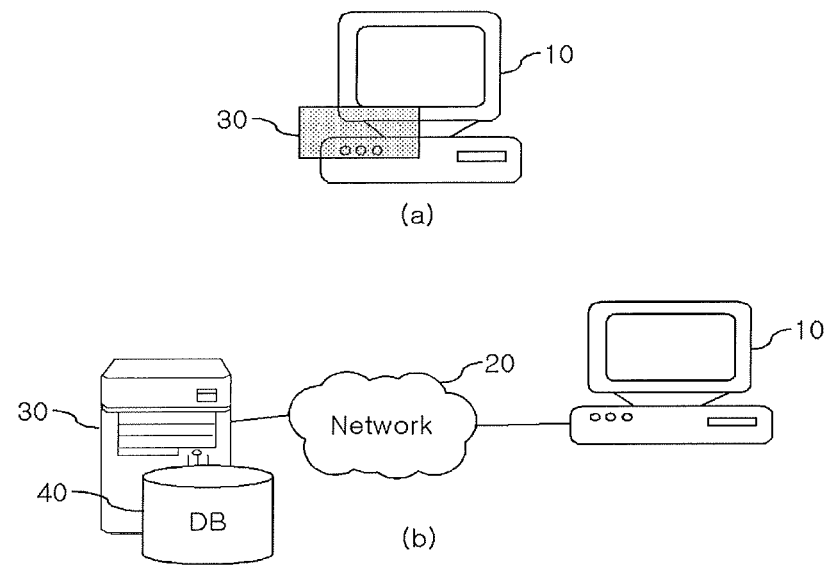
FIG. 2
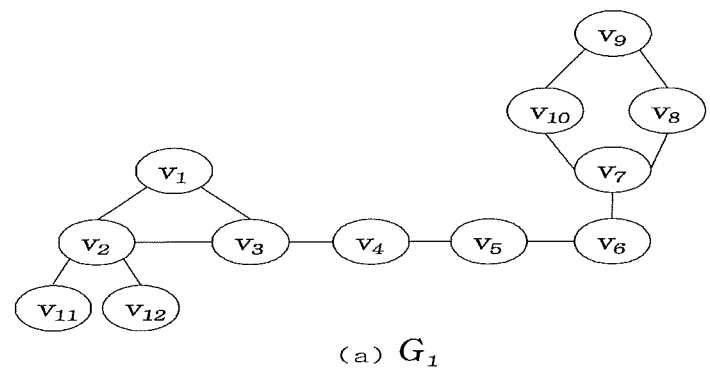
(a) $G_1$
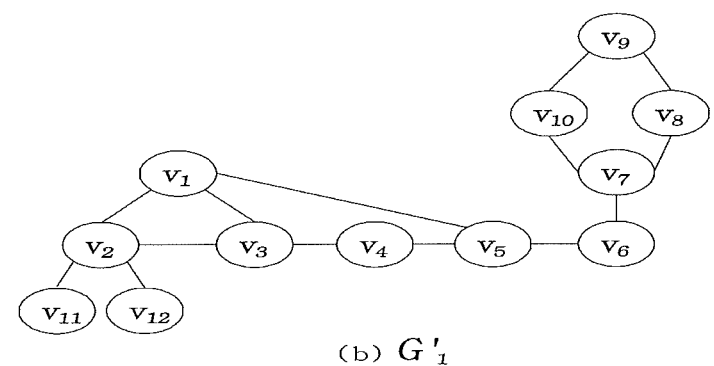
(b) $G'_1$

FIG. 5

| Algorithm 1: FindMUC($C$) |
|---|
| input : $C$ - minimum cycle basis |
| 1 begin |
| 2     $MUCSet$ := A minimum cycle basis $C$; |
| 3     while $\exists\ c_i,\ c_j \in MUCSet$, where $c_i$ and $c_j$ share at least one common vertex do |
| 4        $c_i := c_i$ union $c_j$ ; |
| 5        Remove $c_j$ from $MUCSet$ ; |
| 6     for each $MUC \in MUCSet$ do |
| 7        $Conn(MUC) :=$ a set of connection vertices in MUC ; |
| 8        for each connection vertex $v_i \in Conn(MUC)$ do |
| 9           $G_i :=$ disconnected subgraphs originated from the deletion of a connection vertex $v_i$ ; |

FIG. 6

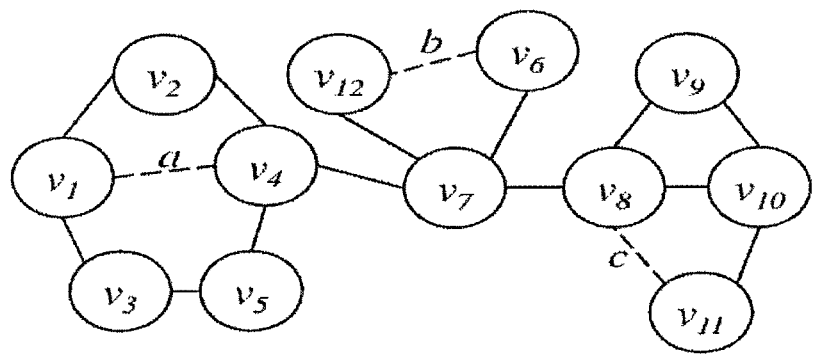

(a) *Insertion*

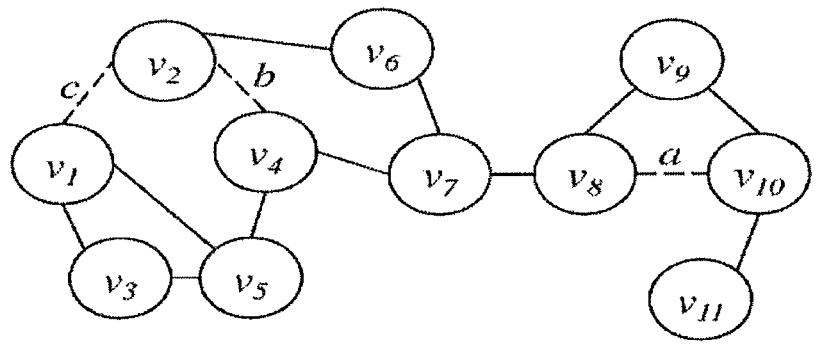

(b) *Deletion*

Algorithm 2: UpdateMUC($v_i, v_j, MUCSet, G$)
--- input : $v_i$ - a vertex in inserted/deleted edge
$v_j$ - a vertex in inserted/deleted edge
$MUCSet$ - a set of MUCs
$G$ - an original graph 1 begin
    // if $v_i$ is not contained any MUC, $MUC(v_i)$ returns $v_i$ only
2   if *Insertion Operation* then
3     if $MUC(v_i) = MUC(v_j)$ then
4       // Do Nothing
5     else
6       $NewMUC :=$ Let be an empty set;
7       for *each vertices $v$ in $\varsigma\rho(v_i, v_j)$ in $G$* do
8         $NewMUC := NewMUC \cup MUC(v)$ ;
9         remove $MUC(v)$ from $MUCSet$ ;
10       add $NewMUC$ to $MUCSet$ ;
11     add edge $(v_i, v_j)$ to graph $G$;
12   else
13     delete edge $(v_i, v_j)$ from graph $G$;
14     if $1 = |Path(v_i, v_j)|$ *in $G$* then
15       remove $MUC(v_i)$ from $MUCSet$ ;
16     else
17       if $\exists v$ *in all* $Path(v_i, v_j)$ then
18         split $MUC(v)$ into $MUCs$;
19       else
20         // Do Nothing

FIG. 10

| Algorithm 3: QUBE($MUC_U$) |
|---| input   : $MUC_U$ - Minimum Union Cycle that updated vertices belong to
    output : $C[v_i]$ - Updated Betweenness Centrality Array 1  begin
2      Let $SP$ be the set of all pair shortest paths in $MUC_U$ ;
3      Let $C[v_i]$ be an empty array, $v_i \in MUC_U$ ;
4      $SP, C[v_i] \leftarrow$ Betweenness() ;
5      for  *each shortest path* $<v_a, \ldots, v_b>$ *in* $SP$ do
6          if $v_a$ *is a connecting vertex* then
7              $G_a :=$ Subgraph connected by a connection vertex $v_a$ ;
8              for  *each* $v_i \in <v_a, \ldots, v_b> - \{v_b\}$ do
9                  $C[v_i] := C[v_i] + \frac{|V_{G_a}|}{|SP(v_a, v_b)|}$ ;
10             if $v_b$ *is also a connecting vertex* then
11                $G_b :=$ Subgraph connected by a connection vertex $v_b$ ;
12                for  *each* $v_i \in <v_a, \ldots, v_b>$ do
13                  $C[v_i] := C[v_i] + \frac{|V_{G_a}| \cdot |V_{G_b}|}{|SP(v_a, v_b)|}$ ;

14          if $G_a$ *is disconnected* then
15              $C[v_a] := C[v_a] + |V_{G_a}|^2 - \sum_{l=1}^{n}(|V_{G_a^l}|^2)$

FIG. 11

| | $v_1$ | $v_2$ | $v_3$ | $v_4$ |
|---|---|---|---|---|
| $c_{MUC}(v_i)$ | 0 | 0 | 0.5 | 0.5 |
| $c_{b_1}(v_i)$ | 15 | | 2.5 | 2.5 |
| $c_{b_2}(v_i)$ | | 12 | 2 | 2 |
| $c_{b_3}(v_i)$ | | | 18 | |
| $c_{t_1^2}(v_i)$ | 20 | 20 | 10 | 10 |
| $c_{t_1^3}(v_i)$ | 30 | | 30 | |
| $c_{t_2^3}(v_i)$ | | 24 | 24 | |
| $c_{t_2}(v_i)$ | | 3 | | |
| $c(v_i)$ | 65 | 59 | 87 | 15 |
| Actual Value | 130 | 118 | 174 | 30 |

FIG. 12a

| Algorithm 4: QUBE-BRANDES($MUC_U$) |
|---|
| input : $MUC_U$ - Minimum Union Cycle that an updated vertices belong to |
| $SGs$ - A set of disconnected subgraphs connected by each connection vertices in $MUC_U$ |
| output : $C[v_i]$ - Updated Betweenness Centrality Array |

1 begin
2     for $v_s \in MUC_U$ do
3         $S \leftarrow$ empty stack ;
4         $P[v_i] \leftarrow$ empty list, for all $v_i \in MUC_U$ ;
5         $\sigma[v_i] := 0$, for all $v_i \in MUC_U$; $\sigma[v_s] := 1$ ;
6         $\sigma_t[v_i] := 0$ for all $v_i \in MUC_U$; $d[v_s] := 0$ ;
7         $d[v_i] := -1$, for all $v_i \in MUC_U$; $d[v_s] := 0$ ;
8         $Q \leftarrow$ empty queue ;
9         enqueue $v_s \rightarrow Q$ ;
10        while $Q$ not empty do
11             dequeue $v_i \leftarrow Q$ ;
12             push $v_i \rightarrow S$ ;
13             for each neighbor $v_n$ of $v_i$ do
14                 if $d[v_n] < 0$ then
15                     enqueue $v_n \rightarrow Q$ ;
16                     $d[v_n] := d[v_i] + 1$ ;
17                 if $d[v_n] = d[v_i] + 1$ then
18                     $\sigma[v_n] := \sigma[v_n] + \sigma[v_i]$ ;
19                     append $v_i \rightarrow P[v_n]$ ;

FIG. 12b

```
20      δ[v_i] := 0, for all v_i ∈ MUC_U ;
21      while S not empty do
22          pop v_n ← S ;
23          if v_s, v_n are connection vertices and v_n ≠ v_s
            then
24              c_t := |V_{G_s}| · |V_{G_n}| ;
25              σ_t[v_n] := σ_t[v_n] + c_t ;
26              C[v_n] := C[v_n] + c_t ;
27          for v_p in P[v_n] do
28              δ[v_p] := δ[v_p] + (σ[v_p]/σ[v_n]) · (1 + δ[v_n]) ;
29              if v_s is connection vertex then
30                  σ_t[v_p] := σ_t[v_p] + σ_t[v_n] · (σ[v_p]/σ[v_n]) ;
31                  C[v_p] := C[v_p] + σ_t[v_n] · (σ[v_p]/σ[v_n]) ;
32          if v_n ≠ v_s then
33              C[v_n] := C[v_n] + δ[v_n] ;
34          if v_s is connection vertex then
35              C[v_n] := C[v_n] + δ[v_n] · |V_{G_s}| · 2;

36      for G_i ∈ SGs do
37          if G_i is disconnected then
38              C[v_i] := C[v_i] + |V_{G_i}|^2 − Σ_{l=1}^{n}(|V_{G_i^l}|^2) ;
```

FIG. 13
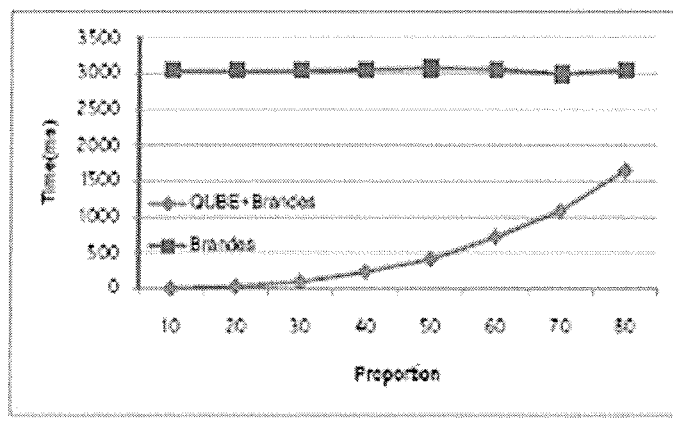
(a) |V|=1000
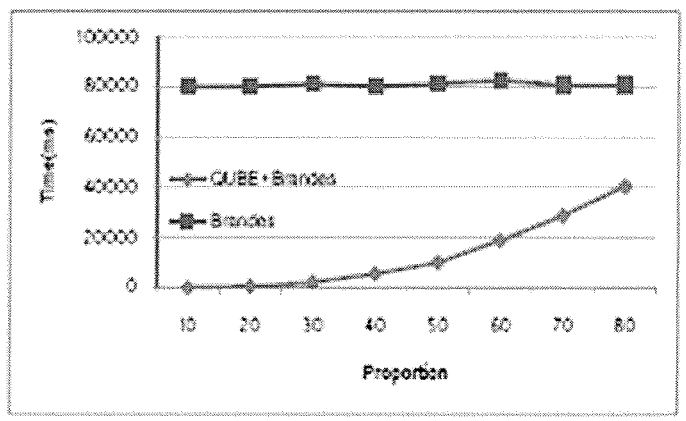
(b) |V|=3000
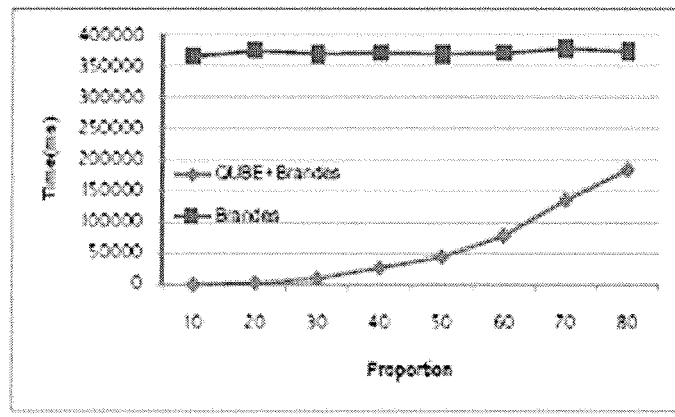
(c) |V|=5000

FIG. 14

| Name | Type | |V| | |E| | Avg. Prop. | Speed-up |
|---|---|---|---|---|---|
| Eva[24] | Ownership | 4457 | 4562 | 6.41 | 2418.17 |
| Erdos02[a] | Collaboration | 5534 | 8472 | 28.66 | 39.57 |
| Erdos972[a] | Collaboration | 4680 | 7030 | 30.00 | 34.39 |
| Pgp[4] | Social | 4680 | 24316 | 42.14 | 13.09 |
| Epa[b] | Web link | 4253 | 8897 | 52.25 | 6.67 |
| Contact [c] | Social | 11604 | 65441 | 62.60 | 4.00 |
| Wikivote[19] | Trust | 7066 | 100736 | 67.73 | 3.00 |
| CAGrQc[19] | Collaboration | 4158 | 13422 | 77.92 | 2.06 |

[a] http://vlado.fmf.uni-lj.si/pub/networks/data
[b] http://www.cs.cornell.edu/courses/cs685/2002fa/
[c] http://stuff.metafilter.com/infodump/

FIG. 15

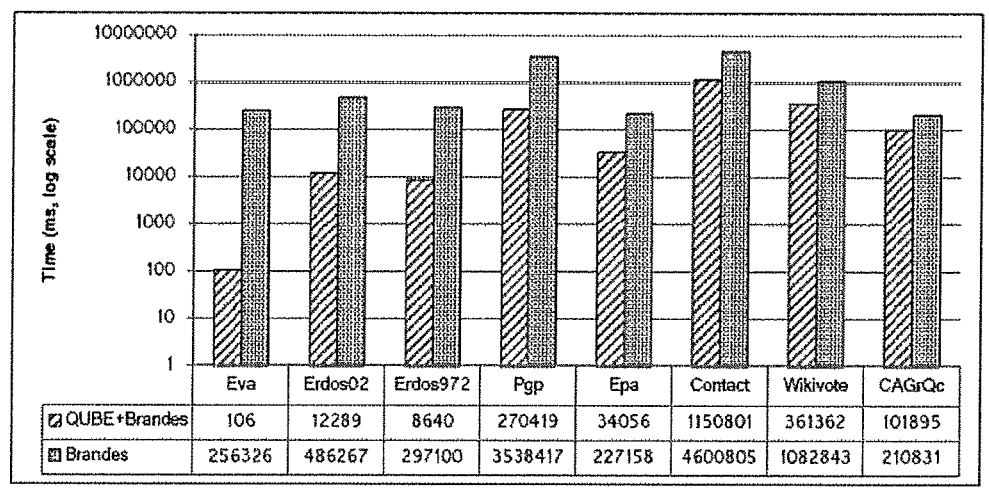

| | Eva | Erdos02 | Erdos972 | Pgp | Epa | Contact | Wikivote | CAGrQc |
|---|---|---|---|---|---|---|---|---|
| QUBE+Brandes | 106 | 12289 | 8640 | 270419 | 34056 | 1150801 | 361362 | 101895 |
| Brandes | 256326 | 486267 | 297100 | 3538417 | 227158 | 4600805 | 1082843 | 210831 |

METHOD FOR UPDATING BETWEENNESS CENTRALITY OF GRAPH

CROSS-REFERENCE TO RELATED APPLICATION

This application claims priority to and the benefit of Korean Patent Application No. 10-2012-0064528, filed on Jun. 15, 2012, the disclosure of which is incorporated herein by reference in its entirety.

BACKGROUND

1. Field of the Invention

The present invention relates to a method for updating betweenness centrality of a graph, which updates the betweenness centrality of an unweighted graph, which comprises vertices and edges with no weights and is updated when an edge is updated.

2. Discussion of Related Art

In general, the betweenness centrality is a measure that computes the relative importance of a vertex in a graph, and it is widely used in network analyses such as a social network analysis, biological graph analysis, and road network analysis. For example, in the social network analysis, a vertex with higher centrality can be viewed as a more important vertex than a vertex with lower centrality. The betweenness centrality of a vertex in a graph is a measure for the participation of the vertex in the shortest paths in the graph.

There are many previous works on the betweenness centrality problem. The concept of the betweenness centrality is proposed in literature 1, but the definition proposed in literature 10 is more widely used. Recently, many variants of the definition are proposed in literature 6. Literature 5 improves the computation time of the betweenness centrality based on a modified breadth-first search algorithm and the dependency of a vertex, and it is the fastest known algorithm that computes the exact betweenness centralities of all the vertices in a graph. As the computation of shortest paths between all pairs of vertices are time consuming, literature 22 proposes another definition of betweenness centrality, which is based on a random walk. In literature 22, each vertex has a probability of visiting its neighbor vertices. Also, literature 7, literature 2, and literature 12 propose approximation algorithms for computing the betweenness centrality. Literature 23 and literature 25 adopt the betweenness centrality for detecting communities in a social network.

Although many works on calculating the betweenness centrality exist and the betweenness centrality is one of the major measures used in analyzing social network graphs, none of the works for computing the betweenness centrality address the problem of updating betweenness centrality.

Applying the previous algorithms to find influential users or detect communities over frequently updated graphs such as a social network graph is inefficient. This is because calculating the betweenness centralities of all users in the graph involves computing the shortest paths between all pairs of users in the graph. In all previous works, the recomputation for all the vertices is inevitable whenever a new edge is inserted to the graph. This recomputation is clearly time-consuming. As the number of edges in the social network graph increases over time [literature 19], the need for updating the betweenness centrality is evident.

It is difficult to update the betweenness centrality, because even a single edge insertion or a single edge deletion leads to the changes in many shortest paths in the graph. This change causes the updates of the betweenness centralities of many vertices in the graph. It is trivial to see that when an edge $(v_i, v_j)$ is inserted to a graph, the shortest path between $v_i$ and $v_j$ is changed. Also, the shortest paths that include the original shortest path from vi to vj are changed.

Prior art research on the computation of betweenness centrality will be described in more detail below.

The computation of betweenness centrality has been gaining much importance in social network analyses, and is widely used in many applications. The earliest work to define the measure which quantifies this idea of betweenness centrality is introduced by Anthonisse et al. [literature 1] and Freeman [literature 10]. Freeman's original method of finding betweenness centrality is based on counting geodesic paths for all pairs of vertices on a graph.

Following Freeman's work, variations of centrality measures are proposed. Everette et al. [literature 17] propose a group betweenness measure which can be applied to groups and classes as well as individuals. Freeman et al. [literature 11] extend Freeman's work [literature 10] to introduce a new measure of centrality based on the concept of network flows, which considers both shortest and certain non-shortest paths. Newman [literature 22] proposes a measure of betweenness centrality based on random walks of any length instead of shortest paths.

Currently, the fastest known algorithm to compute exact betweenness centralities for all the vertices [literature 5] requires $O(|V||E|)$ and $O(|V||E|+|V|^2 \log |V|)$ time on weighted and unweighted graphs, respectively. Traditionally, betweenness centrality was determined by first computing the lengths and number of shortest paths between all pairs, and then summing up pair-dependencies of all pairs [literature 10]. Pair-dependency of a pair $s, t \in V$ on an intermediary vertex $v \in V$ is defined as the ratio of shortest paths between s and t that v lies on to all shortest paths between s and t. Brandes [literature 5] points out the weakness in this approach arguing it is computing more information than needed. The faster algorithm is presented by Brandes [literature 5], based on aggregating path counts from different source vertices in the network.

Although big improvement was made over the very initial betweenness centrality computation algorithm, many researchers argued that the Brandes' algorithm is still too costly for large graphs. In order to overcome such limitation, researchers propose approximation algorithms to compute the estimated betweenness centrality, claiming that good approximation would be an acceptable alternative to exact betweenness centrality value as long as fast computation is possible.

Brandes et al. [literature 7] propose a heuristic estimation method for betweenness centrality computation and conduct experiments with various selection strategies of the source vertices to assess the quality of the estimation. Bader et al. [literature 3] present a parallel algorithm for computing betweenness centrality, optimized for scale-free sparse graphs. They [literature 2] also suggest an algorithm to compute the betweenness centrality of a single vertex in time faster than computing the betweenness of all vertices.

Geisberger et al. [literature 12] suggest a bisection scaling algorithm for approximating a variant of betweenness centrality. Makarychev [literature 21] suggests a linear time approximation algorithm to find the ordering of the vertices that maximizes the number of satisfied betweenness constraints.

Betweenness centrality is used in diverse applications across many different disciplines. Betweenness centrality allows an understanding of the extent to which a vertex contributes in the flow of information. It is mainly used in finding the most prominent vertices in complex networks, whether they are individuals in social networks, elements in biological networks, intersections or junctions in transportation networks, physical elements in computer networks, or documents in World Wide Web.

For example, Leydesdorff [literature 20] demonstrates in his research how betweenness centrality is shown to be an indicator of the interdisciplinarity of scientific journals, and del Sol et al. [literature 8] use the betweenness centrality in identifying the most central residues in protein-protein complex structures. Jin et al. [literature 15] demonstrate an application of parallel betweenness centrality to detect potentially harmful nodes in an electrical grid. The electrical grid is an interconnected network for delivering electricity from suppliers to consumers.

Holme [literature 13] studies the relationship between betweenness centrality and the density of a traffic model, and Lammer et al. [literature 18] use betweenness centrality in approximating the importance of a road or a junction and investigated the scaling laws associated with urban road networks in Germany. In many applications, the network structures are typically not static. As the network evolves, the network graphs constantly change over time, which implies that there is a strong need for an efficient algorithm to update betweenness centrality.

Betweenness centrality is also used in community detection. Newman et al. [literature 23] propose a divisive community detection technique which iteratively removes edges with the highest betweenness centrality value from the network. Pinney et al. [literature 25] suggest an alternative community detection algorithm in which the network decomposition is based on vertex betweenness instead of edge betweenness. Newman et al. [literature 23] discuss a weakness in the existing algorithms which is a high computation cost associated with iterative recalculation of all-pair shortest paths when the edges are removed.

As observed in many applications, the dynamic nature of many real-life networks is a clear evidence that efficiently updating betweenness centrality is an important issue. However, no literature dealing with the problem of efficiently updating betweenness centrality in a dynamic network environment exists at present.

PRIOR ART LITERATURES

Non-Patent Literatures

[Literature 1] J. Anthonisse and S. M. C. A. A. M. besliskunde. The rush in a directed graph. Technical report, 1971.

[Literature 2] D. A. Bader, S. Kintali, K. Madduri, and M. Mihail Approximating betweenness centrality. In *Proceedings of the 5th international conference on Algorithms and models for the web-graph*, WAW'07, pages 124-137, Berlin, Heidelberg, 2007. Springer-Verlag.

[Literature 3] D. A. Bader and K. Madduri. Parallel algorithms for evaluating centrality indices in real-world networks. In *Proceedings of the 2006 International Conference on Parallel Processing*, ICPP '06, pages 539-550, Washington, D.C., USA, 2006. IEEE Computer Society.

[Literature 4] M. Boguna, R. Pastor-Satorras, A. Diaz-Guilera, and A. Arenas. Models of social networks based on social distance attachment. *Phys. Rev. E*, 70(5):056122, November 2004.

[Literature 5] U. Brandes. A faster algorithm for betweenness centrality. *Journal of Mathematical Sociology*, 25 (1994): 163-177, 2001.

[Literature 6] U. Brandes. On variants of shortest-path betweenness centrality and their generic computation. *Social Networks*, 30(2):136-145, 2008.

[Literature 7] U. Brandes and C. Pich. Centrality estimation in large networks. *International Journal Of Bifurcation And Chaos*, 17(7):2303, 2007.

[Literature 8] A. del Sol, H. Fujihashi, and P. O'Meara. Topology of small-world networks of protein-protein complex structures. *Bioinformatics*, 21(8):1311-1315, April 2005.

[Literature 9] P. Erdos and A. Renyi. On random graphs, I. 1959. *Publicationes Mathematicae (Debrecen)*, 6:290-297, 1959.

[Literature 10] L. C. Freeman. A set of measures of centrality based on betweenness. *Sociometry*, 40(1):35-41, 1977.

[Literature 11] L. C. Freeman, S. P. Borgatti, and D. R. White. Centrality in valued graphs: A measure of betweenness based on network flow. *Social Networks*, 13(2):141-154, 1991.

[Literature 12] R. Geisberger, P. Sanders, and D. Schultes. Better approximation of betweenness centrality. In J. I. Munro and D. Wagner, editors, *ALENEX*, pages 90-100. SIAM, 2008.

[Literature 13] P. Holme. Congestion and centrality in traffic flow on complex networks. *Advances in Complex Systems*, 6(2):163-176, January 2003.

[Literature 14] J. D. Horton. A polynomial-time algorithm to find the shortest cycle basis of a graph. SIAM J. *Comput.*, 16:358-366, April 1987.

[Literature 15] S. Jin, Z. Huang, Y. Chen, D. G. Chavarria-Miranda, J. Feo, and P. C. Wong. A novel application of parallel betweenness centrality to power grid contingency analysis. In IPDPS, pages 1-7. IEEE, 2010.

[Literature 16] T. Kavitha, K. Mehlhorn, D. Michail, and K. E. Paluch. A faster algorithm for minimum cycle basis of graphs. In ICALP, pages 846-857, 2004.

[Literature 17] E. D. Kolaczyk, D. B. Chua, and M. Barthelemy. Group betweenness and co-betweenness: Interrelated notions of coalition centrality. *Social Networks*, 31(3): 190-203, July 2009.

[Literature 18] S. Lammer, B. Gehlsen, and D. Helbing. Scaling laws in the spatial structure of urban road networks. *Physica A: Statistical Mechanics and its Applications*, 363 (1):89-95, April 2006.

[Literature 19] J. Leskovec, J. Kleinberg, and C. Faloutsos. Graph evolution: Densification and shrinking diameters. *ACM Trans. Knowl. Discov. Data*, 1(1):2, 2007.

[Literature 20] L. Leydesdorff. Betweenness centrality as an indicator of the interdisciplinarity of scientific journals. *Journal of the American Society for Information Science and Technology*, 58(9):1303-1309, 2009.

[Literature 21] Y. Makarychev Simple linear time approximation algorithm for betweenness. Technical report, 2009.

[Literature 22] M. E. J. Newman. A measure of betweenness centrality based on random walks. *Social Networks*, 27(1): 39-54, 2005.

[Literature 23] M. E. J. Newman and M. Girvan. Finding and evaluating community structure in networks. *Physical Review E*, 69 2):26113, 2004.

[Literature 24] K. Norlen, G. Lucas, M. Gebbie, and J. Chuang. EVA: Extraction, Visualization and Analysis of the Telecommunications and Media Ownership Network, August 2002.

[Literature 25] J. W. Pinney and D. R. Westhead. Betweenness-based decomposition methods for social and biological networks. In *Interdisciplinary Statistics and Bioinformatics*, pages 87-90. Leeds University Press, 2006.

SUMMARY OF THE INVENTION

The prevent invention has been made in an effort to solve the above-described problems associated with the prior art, and an object of the present invention is to provide a method for updating betweenness centrality of a graph, which updates the betweenness centrality of an unweighted graph, which comprises vertices and edges with no weights and is updated when a new edge is inserted or an existing edge is deleted.

Another object of the present invention is to provide a method for updating betweenness centrality of a graph, which extracts a candidate set (or $MUC_U$) of vertices whose betweenness centralities can be updated, calculates their local betweenness centralities using candidate vertices only, and calculates betweenness centrality (or global betweenness centrality) over the entire graph using the local betweenness centrality.

Still another object of the present invention is to provide a method for updating betweenness centrality of a graph, which obtains the entire minimum unit cycle (MUC) in a graph, which is updated by the insertion or deletion of an edge, by updating only the MUC containing vertices of the updated edge in the already obtained MUCs.

According to an aspect of the present invention for achieving the above objects, there is provided a method for updating betweenness centrality of a graph, which obtains the betweenness centrality of an unweighted graph (hereinafter referred to as an original graph), which comprises vertices and edges with no weights and is updated (hereinafter referred to as an updated graph) when an edge is updated (i.e., an updated edge), the method comprising the steps of: (a) obtaining a minimum union cycle (hereinafter referred to as an MUC) of the updated graph; (b) extracting an MUC (hereinafter referred to as an $MUC_U$) containing a vertex, which is incident to the updated edge, and calculating the betweenness centrality (hereinafter referred to as local betweenness centrality) due to the shortest paths (hereinafter referred to as internal paths) in the $MUC_U$; (c) obtaining the betweenness centrality (i.e., an increase of an external path) due to the shortest paths (hereinafter referred to as external paths) of the graph, which are not included in the $MUC_U$; and (d) calculating the betweenness centrality (hereinafter referred to as global betweenness centrality) of the graph by adding the increase of the external path to the local betweenness centrality, wherein the MUC may be a subset (hereinafter referred to as a cycle) of edges of the graph, in which every vertex of the graph is incident to an even number of edges, and may be obtained by summing up the cycles of the set of vertices having the minimum total weight (i.e., a minimum cycle basis) among the maximal set of linearly independent cycles (i.e., a cycle basis).

In step (a), the MUC of the updated graph may be obtained by updating only the MUC containing the updated vertex among the MUCs of the original graph.

In step (a), if the updated vertex of the updated edge to be inserted belongs to the same MUC (hereinafter referred to as an MUC to be inserted), the MUC may be updated by inserting the updated edge into only the MUC to be inserted and, if the updated vertex does not belong to the same MUC, the MUC may be updated by obtaining the MUC containing the shortest path between the updated vertices, including the obtained MUC in the MUC of the original graph, and removing the MUC of the original graph containing the updated vertices.

In step (a), if the number of shortest paths between the updated vertices of the updated edge to be deleted is one, the MUC may be updated by removing the MUC containing the updated vertices from the original graph, if the number of shortest paths is at least two and there exists at least one vertex appearing in all the paths between the updated vertices, the MUC of the original graph may be disconnected, and if there does not exist the at least one vertex, the MUC may be updated by removing the updated edge.

In step (c), a first increase of the external path due to the external paths whose source or target is in the $MUC_U$ and a second increase of the external path due to the external paths whose source and target pass through the $MUC_U$ but are all not in the $MUC_U$ may be obtained.

The first increase of the external path $c_{b_j}(v_i)$ may be obtained by the following Formula 1:

$$c_{b_j}(v_i) = |V_{G_j}| \cdot \sum_k \frac{\sigma_{v_j,v_k}(v_i)}{\sigma_{v_j,v_k}} \quad \text{[Formula 1]}$$

where $v_i, v_j, v_k \in MUC_U$, $i \neq k$, $j \neq k$, $v_j$ is a connection vertex to $G_j$, $V_{G_j}$ is a set of vertices of subgraph $G_j$ connected to a connection vertex $v_j$, and $|V_{G_j}|$ is the cardinality of the set of vertices of subgraph $G_j$.

The second increase of the external path may comprise an increase (hereinafter referred to as a second-first increase of the external path) in which a subgraph of connection vertices of the $MUC_U$ containing the source or target is not disconnected and an increase (hereinafter referred to as a second-second increase of the external path) in which the subgraph is disconnected.

The second-first increase of betweenness centrality $\overline{c_{t_j^k}(v_i)}$ and the second-second increases of betweenness centrality $c_{t_i}(v_i)$ may be calculated by the following Formula 2 and Formula 3:

$$c_{t_j^k}(v_i) = |V_{G_j}| \cdot |V_{G_k}| \cdot \frac{\sigma_{v_j,v_k}(v_i)}{\sigma_{v_j,v_k}} \quad \text{[Formula 2]}$$

where $v_i, v_j, v_k \in MUC_U$, $j \neq k$, $v_j$ and $v_k$ are connection vertices to $G_j$ and $G_k$, $V_{Gj}$ and $V_{Gk}$ are sets of vertices of subgraphs $G_j$ and $G_k$ connected to connection vertices $v_j$ and $v_k$, and $|V_{Gj}|$ and $|V_{Gk}|$ are the cardinalities of the sets of vertices of subgraphs $G_j$ and $G_k$.

$$c_{t_i}(v_i) = \begin{cases} |V_{G_i}|^2 - \sum_{l=1}^{n}\left(|V_{G_i^l}|^2\right) & \text{if } G_i \text{ is disconnected} \\ 0 & \text{otherwise} \end{cases} \quad \text{[Formula 3]}$$

where $G_j^l$ is the $l^{th}$ connected component of $G_i$, n is the number of connected components in $G_i$, and $v_i$ is the connection vertex to $G_i$.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a schematic diagram showing the configuration of the entire system for implementing the present invention;

FIG. 2 is an example of a graph update;

FIG. 5 shows Algorithm 1 for finding MUCs in accordance with the present invention;

FIG. 6 is an example of updating MUCs in accordance with the present invention;

FIG. 7 shows Algorithm 2 for finding MUCs in accordance with the present invention;

FIG. 10 shows Algorithm 3 for updating the betweenness centrality of MUCs in accordance with the present invention;

FIG. 11 is an example of updating the betweenness centrality in accordance with an experimental example of the present invention;

FIG. 12 shows Algorithm 4 in which the method of the present invention is applied to the Brandes' algorithm;

FIG. 13 is a graph showing the betweenness centrality time on synthetic data in accordance with an experiment result of the present invention;

FIG. 14 is a table showing the speed-up on real data in accordance with an experiment result of the present invention;

FIG. 15 is a graph showing the betweenness centrality update time on real data in accordance with an experiment result of the present invention.

DETAILED DESCRIPTION OF EXEMPLARY EMBODIMENTS

Figure 3:
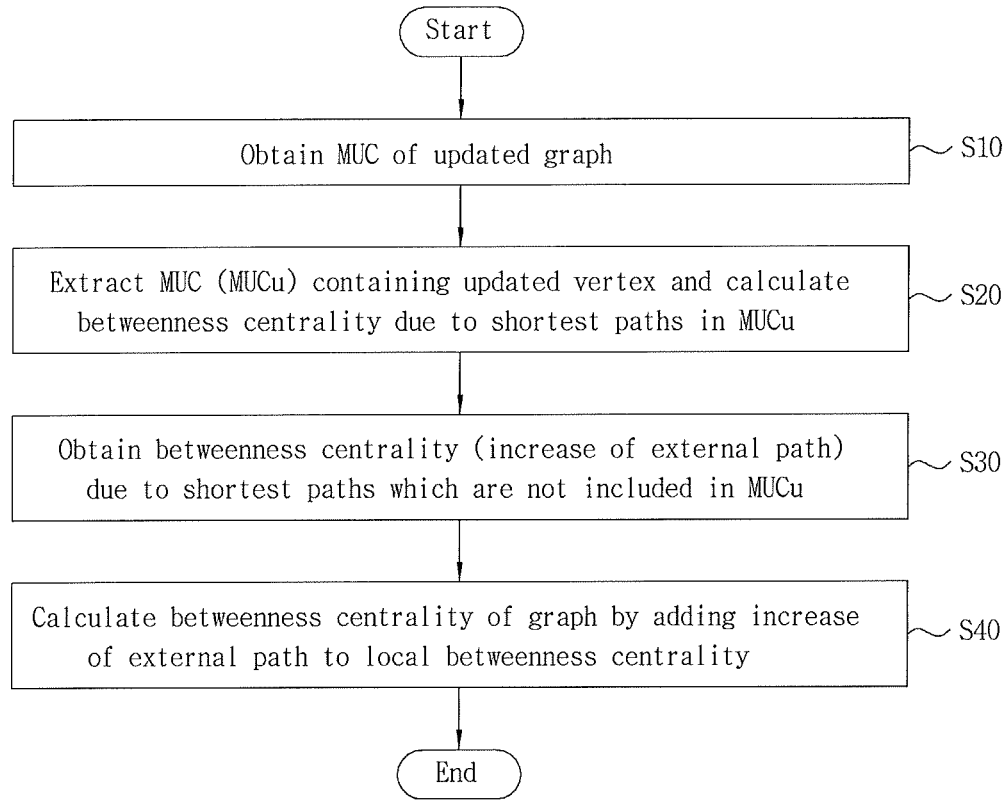
FIG. 3 is a flowchart illustrating a method for updating betweenness centrality of a graph in accordance with an exemplary embodiment of the present invention.

Hereinafter, exemplary embodiments of the present invention will be described in detail with reference to the accompanying drawings. Like reference numerals in the drawings denote like elements, and thus repeated descriptions will be omitted.

First, the configuration of the entire system for implementing the present invention will be described with reference to FIGS. 1(a) and 1(b). As shown in FIGS. 1(a) and 1(b), a method for updating betweenness centrality of a graph in accordance with an exemplary embodiment of the present invention may be implemented as a computer terminal or a server system over a network.

As shown in FIG. 1(a), an example of the entire system for implementing the present invention may comprise a computer terminal 10 and a betweenness centrality update system 30, which is installed in the computer terminal 10. That is, the functions of the betweenness centrality update system 30 are implemented as a computer program and installed in the computer terminal 10. The betweenness centrality update system 30 reads out and processes a graph or data for update pre-stored in a storage medium of the computer terminal 10 or input through an input device.

Alternatively, as another embodiment, the method for updating the betweenness centrality of the graph in accordance with the present invention may be configured as a micro-program to be implemented as a dedicated IC chip driven by a microprocessor or may be implemented as an electronic circuit such as an application-specific integrated circuit (ASIC), etc. That is, the betweenness centrality update system 30 may be configured in the form of software or in the form of an electronic circuit comprising FPGA chips or several circuit elements. Otherwise, the betweenness centrality update system 30 may be implemented as other possible forms.

Next, as shown in FIG. 1(b), another example of the entire system for implementing the present invention comprises a computer terminal 10 and a server 30 for processing the betweenness centrality update method, which are connected to each other through a network 20. The entire system may further comprise a database 40 for storing necessary data.

The computer terminal 10 is a typical computing terminal such as a PC, notebook, netbook, etc. that a user uses.

The server 30 is connected to the network 20 to construct a graph and update the construct graph by collecting data over the network 20 or receiving data from the computer terminal 10. Moreover, the server 30 calculates the betweenness centrality on the constructed graph and, if the graph is updated, updates and stores betweenness centrality values as well as the graph. For example, if the server 30 is used in the social network analysis, the server 30 constructs or updates a graph by collecting data on the social network over the Internet.

The database 40 is a typical storage medium for storing data required by the server 30 and stores graph information, betweenness centrality values, etc. Data stored in the database 40 may be stored in the storage medium of the computer terminal 10 in the example of FIG. 1(a).

Although the above-described method for updating the betweenness centrality of the graph in accordance with the present invention may be implemented in various ways, the program system installed in the computer terminal in the example of FIG. 1(a) will be described for the sake of convenience.

Next, the basic concept of the present invention will be described in more detail with reference to FIG. 2.

In FIG. 2, let $G_1$ be a graph and $G'_1$ be an updated graph of $G_1$. When an edge $(v_1, v_5)$ is inserted, the shortest path between $v_1$ and $v_5$ is changed. Also, there are many shortest paths that are changed e.g., the shortest path between $v_{12}$ and $v_5$ and the shortest path between $v_{10}$ and $v_{11}$.

However, it can be observed that there exist vertices whose betweenness centralities do not change even when the graph is updated. In FIG. 2(b), the betweenness centralities of $v_1$, $v_3$, $v_4$ and $v_5$ change, while the betweenness centralities of the other vertices do not change. The betweenness centralities of $v_2$, $v_6$, $v_7$, $v_8$, $v_9$, $v_{10}$, $v_{11}$ and $v_{12}$ do not change, because the source-target pairs of original shortest paths that go through $v_2$, $v_6$, $v_7$, $v_8$, $v_9$, $v_{10}$, $v_{11}$ and $v_{12}$ do not change even when $G_1$ is updated to $G'_1$.

Based on the above observation, the present invention proposes a Quick algorithm for Updating BEtweenness centrality (QUBE). The key idea of the present invention is to perform the betweenness centrality computation on a reduced set of vertices. The present invention first finds the set of vertices whose betweenness centralities can be changed and the set(s) of vertices whose betweenness centralities do not change.

In FIG. 2(b), $\{v_1,v_2,v_3,v_4,v_5\}$ is the set of vertices whose betweenness centralities can be changed, and $\{v_6,v_7,v_8,v_9,v_{10}\}$, $\{v_{11}\}$, $\{v_{12}\}$ are the sets of vertices whose betweenness centralities do not change. The method of finding these sets will be described later, and it is easy to see that the latter three sets correspond to connected components after removing the first set from $G_1$.

The present invention computes the betweenness centrality only on the first set of vertices. In the prior art, all pair shortest paths recomputation is necessary to compute the betweenness centrality and the number of shortest paths that need to be recomputed on $G_1$ would be 12·11/2=66. On the other hand, in the method according to the present invention, only 5·4/2=10 shortest paths need to be recomputed. Clearly, the smaller the cardinality of the first set, the shorter the amount of time it would take in computing the necessary shortest paths.

In order to recompute the betweenness centrality of a vertex in the reduced set, in addition to the betweenness centrality in the reduced set, the number of shortest paths that satisfy the following conditions needs to be considered.

1. The shortest path goes through at least one of vertices in the reduced set.
2. The shortest path's source or target or both are not in the reduced set.

The number can be obtained based on the cardinality of the set(s) of vertices whose betweenness centralities do not change without actually computing the shortest paths. For example, the shortest paths from $v_{12}$ to $v_6$ always go through vertices in the reduced set. Similarly, the shortest paths from $v_i \in \{v_{12}\}$ to $v_j \in \{v_6, v_7, v_8, v_9, v_{10}\}$ always go through vertices in the reduced set. Therefore, the number of shortest paths from $v_j$ to $v_j$ is a product of the cardinalities of the two sets, which is 5.

Next, the betweenness centrality used in the present invention will be described in more detail.

The betweenness centrality is a measure that computes the relative importance of a vertex in a graph. The formal definition is presented below.

A graph is represented by G=(V,E), where V is the set of vertices, and $E \subseteq V \times V$ is the set of edges. A path in a graph is represented by a sequence of vertices, $(v_1, \ldots, v_n)$ where $v_i, v_j \in V$ for $1 \le i, j \le n$, $i \ne j$ except possible 1=n.

[Definition 1] Betweenness Centrality

The betweenness centrality of a vertex $vj \in G$ is represented by the following Formula 1:

$$c(v_j) = \sum_{i,k} \frac{\sigma_{v_i, v_k}(v_j)}{\sigma_{v_i, v_k}} \qquad \text{[Formula 1]}$$

where $v_i, v_j, v_k \in V$, $i \ne j \ne k$, $\sigma_{v_i, v_k}(v_j)$ is the number of shortest paths between $v_i$ and $v_k$ that include $v_j$, and $\sigma_{v_i, v_k}$ is the number of shortest paths between $v_i$ and $v_k$.

The betweenness centrality can be computed as follows:

1. For each pair of vertices ($v_s$ and $v_t$), compute the shortest paths between the two vertices.
2. For each pair of vertices, compute the ratio of the participation of each vertex in the shortest path(s). The ratio is the number of shortest paths between $v_s$ and $v_t$ that go through $v_j$ divided by the number of shortest paths between $v_s$ and $v_t$.
3. Accumulate the ratio for all pairs of vertices.

Let us consider updating the betweenness centrality caused by a graph update. Even a simple update, for example inserting an edge to a graph, could change existing shortest paths for many pairs of vertices in the graph. One of the biggest drawbacks in updating the betweenness centrality using the previous methods is that the shortest paths for all pairs of vertices are recomputed whenever an update occurs in a graph.

Next, a method for updating betweenness centrality of a graph in accordance with an exemplary embodiment of the present invention will be described in more detail with reference to FIG. 3.

As shown in FIG. 3, a method for updating betweenness centrality of a graph in accordance with an exemplary embodiment of the present invention comprises (a) obtaining an MUC of an updated graph (S10), (b) extracting an MUC ($MUC_U$) containing an updated vertex and calculating the betweenness centrality (i.e., local betweenness centrality) due to the shortest paths (i.e., internal paths) in the $MUC_U$ (S20), (c) obtaining the betweenness centrality (i.e., an increase of an external path) due to the shortest paths (i.e., external paths) of the graph, which are not included in the $MUC_U$ (S30), and (d) calculating the betweenness centrality (i.e., global betweenness centrality) of the graph by adding the increase of the external path to the local betweenness centrality (S40).

That is, the method identifies the set of vertices whose betweenness centralities can be changed, and the set(s) of vertices whose betweenness centralities do not change. Through the analysis of possible changes in the betweenness centrality that can occur as a result of graph updates, the characteristics of the sets of vertices in which the changes in the betweenness centralities do and do not occur were discovered. Observed pattern is applicable for any type of connected graphs.

Then, the method performs the betweenness centrality computation on the identified sets of vertices whose betweenness centralities can be changed. The computed values will be referred to as the local betweenness centrality. On top of the local betweenness centrality, the method performs additional calculations on the vertices whose shortest paths are not yet considered. Through simple additional calculations, the exact betweenness centrality can be restored without performing an expensive computation on all the vertices on a graph, such as the calculation of all pair shortest paths.

First, the step of obtaining an MUC of an updated graph (S10) will be described.

The updated graph refers to a graph which is updated when an edge is inserted into or deleted from an original graph. Preferably, the MUCs of the updated graph are obtained by updating only the MUC containing the vertex of the edge updated out of the MUCs of the original graph (or a graph before update). That is, after obtaining the MUCs from the initial graph, the MUCs of the updated graph are continuously obtained by updating the MUC whenever the edge is updated.

That is, the minimum union cycle (MUC) is obtained from the update graph (S10). Here, the MUCs of the updated graph are obtained by updating only the MUC containing the updated vertex out of the MUCs of the original graph. Here, several MUCs are obtained.

Next, the method for obtaining the MUCs from the initial graph will be described.

[Definition 2] Cycle Basis

Let a graph G=(V,E) be an undirected graph. A cycle C is a subset of edges such that every vertex of V is incident to an even number of edges in C. Each cycle C can be represented by an edge incidence vector in $\{0, 1\}^{|E|}$ where a component is equal to 1 precisely when $e \in C$. A maximal set of linearly independent cycles is called a cycle basis.

[Definition 3] Minimum Cycle Basis (MCB)

Let a graph G=(V,E) be an undirected connected graph with a nonnegative weight we assigned to each edge $e \in E$. Minimum cycle basis (MCB) is a cycle basis C of minimum total weight, i.e., which minimizes w(C).

Here, w(c) is as follows:

$$w(C) = \sum_{i=1}^{v} w(C_i), w(C_i) = \sum_{e \in C_i} w_e$$

Figure 4:
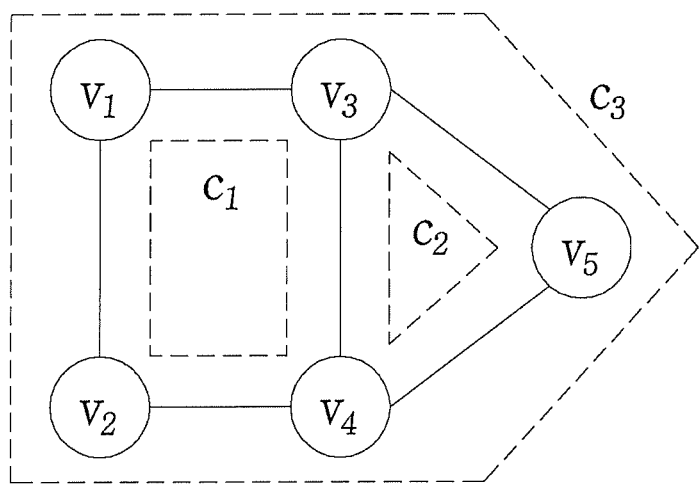
FIG. 4 is an example of a cycle basis and a minimum cycle basis in accordance with the present invention.

The example depicted in FIG. 4 has three cycle basis sets $\{C_1, C_2\}$, $\{C_1, C_3\}$, and $\{C_2, C_3\}$. If every edge in the graph has the same weight (i.e., 1 for all edges), MCB is $\{C_1, C_2\}$. The detailed definitions of cycle basis and minimum cycle basis can be found in [literature 16].

Next, the minimum union cycle (MUC) will be described in more detail.

A set of vertices whose betweenness centralities can be changed is distinguished from the set(s) of vertices whose betweenness centralities do not change. Such sets are identified by using MUCs obtained during the preprocessing time. The initial set of MUCs is found and stored during the preprocessing time. As changes occur in a graph, stored MUCs also need to be changed. Changes in MUCs are managed during the runtime.

The minimum union cycle (MUC) is defined as follows.

[Definition 4] Minimum Union Cycle (MUC)

Given a minimum cycle basis C and minimum cycles $C_i \in C$, let $V_{C_i}$ be the set of vertices in $C_i$. Recursively union two $V_{C_i}$s together if they share at least one common vertex. Then each final set of vertices forms an MUC.

In summary, the MUC is a subset (hereinafter referred to as a cycle) of edges of the graph in which every vertex of the graph is incident to an even number of edges. That is, the MUC is obtained by summing up the cycles of the set of vertices having the minimum total weight (hereinafter referred to as a minimum cycle basis) among the maximal set of linearly independent cycles (hereinafter referred to as a cycle basis).

Each vertex appears in only one MUC since MUCs are disjoint sets. MUC(v) is denoted as MUC which contains vertex v.

Next, a connection vertex is defined as follows.

[Definition 5] Connection Vertex

Vertex $v \in MUC$ is a connection vertex, if v is an articulation vertex and v has an edge to a vertex $w \notin MUC(v)$.

The articulation vertex refers to a vertex that disconnects a graph when a corresponding vertex and an edge which is incident to the vertex are deleted from the graph. In the same meaning, all paths from vertex v to vertex w must have two vertices v and w that go through the articulation vertex.

Figure 9:
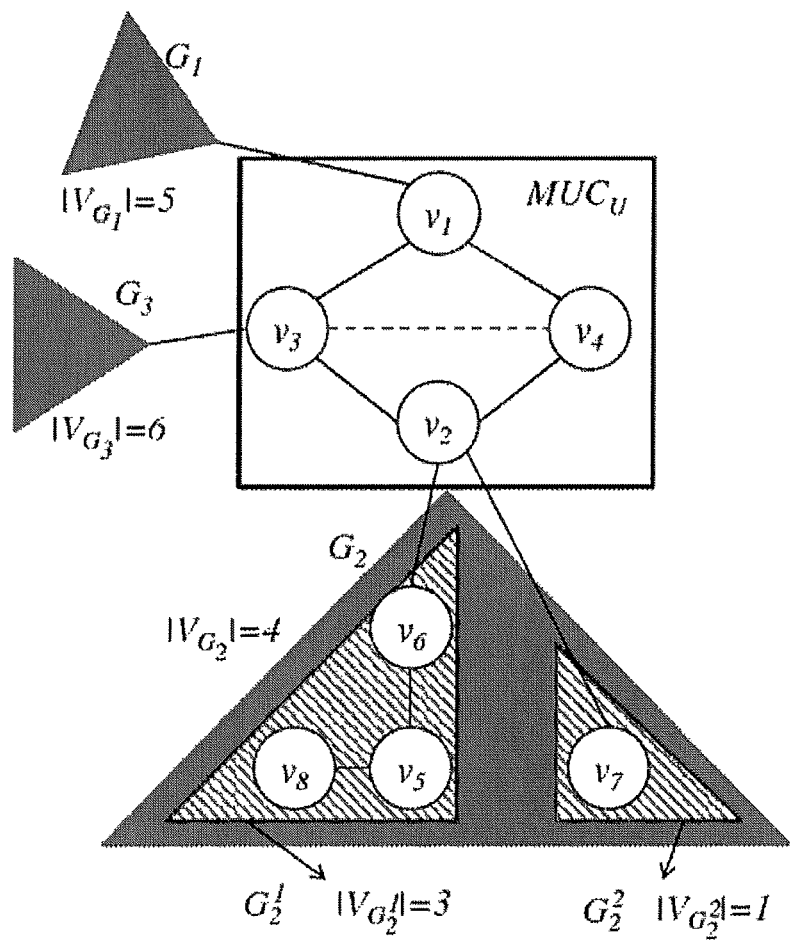
FIG. 9 is an example of updating the betweenness centrality in accordance with the present invention.

In FIG. 9, let us assume that an edge $(v_3, v_4)$ is inserted. $MUC(v_3)$ is $\{v_1, v_2, v_3, v_4\}$, and the connection vertices of $MUC(v_3)$ are $v_1$, $v_2$ and $v_3$.

The deletion of a connection vertex makes the graph disconnected since the connection vertex is also an articulation vertex. A graph that is disconnected from $MUC(v_i)$ is denoted as a result of the deletion of a connection vertex $v_i$ as a disconnected subgraph $G_i$. In FIG. 9, $G_1$, $G_2$, and $G_3$ are disconnected subgraphs generated from the deletion of connection vertex $v_1$, $v_2$, and $v_3$, respectively.

Next, the method for extracting the MUCs from the graph will be described with reference to FIG. 5. FIG. 5 shows the method for extracting the MUCs from the graph with an algorithm.

In detail, a method for generating a set of MUCs, a set of connection vertices for each MUC and disconnected subgraphs derived from the deletion of connection vertices will be described.

Algorithm 1 in FIG. 5 uses a minimum cycle basis C as an input and finds a set of MUCs (MUCSet) and a set of connection vertices with corresponding subgraphs.

The calculation of a minimum cycle basis is well studied in the field of graph theory, and many efficient algorithms, such as Horton's algorithms [literature 14] and Kavitha's algorithm [literature 16], exist. In Line 2 of Algorithm 1, a minimum cycle basis is calculated using an existing algorithm. In Lines 3 to 5, the algorithm finds a set of MUCs (MUCSet) by unioning the cycles in a minimum cycle basis until the unioned cycles are disjoint from each other. A set of connection vertices for each MUC and disconnected subgraphs derived from the deletion of connection vertices are extracted in Lines 7 to 9.

Note that Algorithm 1 is performed during the preprocessing time.

After a set of MUCs are obtained from the initial graph, the set of MUCs are continuously updated in an MUC updating algorithm (Algorithm 2) and the MUC (or MUC set) of the updated graph is obtained. That is, the MUC updating algorithm needs to be processed during the runtime.

Next, the method for updating MUCs (or MUC set) will be described with reference to FIGS. 6 and 7. FIG. 6 is an example of updating MUCs in accordance with the present invention, and FIG. 7 shows Algorithm 2 for finding MUCs in accordance with the present invention.

Here, the method for maintaining a set of MUCs, a set of connection vertices for each MUC and disconnected subgraphs derived from the deletion of a connection vertex will be described. An edge is inserted into or deleted from a graph, and thus the graph is updated. Here, the edge will be called an updated edge, and the vertex which is incident to the updated edge will be called an updated vertex.

As shown in Algorithm 2 of FIG. 7, if the updated vertex of the updated edge to be inserted belongs to the same MUC (hereinafter referred to as an MUC to be inserted) in the original graph, the updated edge is inserted only into the MUC to be inserted to update the MUC (Lines 3 and 4). Moreover, if the updated vertex does not belong to the same MUC, an MUC containing the shortest paths between the updated vertices is obtained and included in the MUC of the original graph, and the MUC containing the updated vertices in the original graph is removed, thus updating MUCs (Lines 6 to 10).

Moreover, if the number of shortest paths between the updated vertices of the updated edge to be deleted is one, the MUC containing the updated vertices is removed, thus updating MUCs (Lines 14 and 15). If the number of shortest paths is at least two and there exists at least one vertex appearing in all the paths between the updated vertices, the MUC of the original graph is disconnected (Lines 17 and 18), and if there does not exist the at least one vertex, the updated edge is removed, thus updating MUCs (Lines 13, 19 and 20).

The method for updating MUCs will be described in more detail with reference to the example of FIG. 6.

Each case of updating MUCs according to the insertion or deletion of an edge will be described as follows (Initial MUCs in FIG. 6(a) are $\{v_1, v_2, v_3, v_4, v_5\}$ and $\{v_8, v_9, v_{10}\}$, and initial MUCs in FIG. 6(b) are $\{v_1, v_2, v_3, v_4, v_5, v_6, v_7\}$ and $\{v_8, v_9, v_{10}\}$.).

1. When an edge is inserted (a) No change, if the new edge connects two vertices in one MUC. In FIG. 6(a), the insertion of edge (a) does not affect any MUCs (Line 4 in Algorithm 2).

(b) A new MUC is created, if vertices in an existing shortest path between two vertices in the new edge are not included in any MUC. In FIG. 6(a), the insertion of edge (b) induces a creation of a new MUC containing $\{v_6, v_7, v_{12}\}$ (Lines 6 to 10 in Algorithm 2. $\sigma\rho(v_i, v_j)$ is the set of vertices in shortest paths between $v_i$ and $v_j$).

(c) MUC is merged with the vertices and other MUCs to create a new MUC, if vertices in existing shortest paths between two vertices of the new edge are included in some MUCs. In FIG. 6(a), the insertion of edge (c) induces MUC ($v_{10}$) to merge with $v_{11}$ (Lines 6 to 10 in Algorithm 2).

2. When an edge is deleted (a) MUC is destroyed, if there exists only one path between two vertices in the deleted edge as a result of the deletion. In FIG. 6(b), the deletion of edge (a) causes the destruction of MUC($v_{10}$) (Lines 14 and 15 in Algorithm 2. Path ($v_i$, $v_j$) is the set of paths between $v_i$ and $v_j$.).

(b) No change, after the deletion, if there still exists more than one path between the two vertices and does not exist a vertex appearing in all the paths between the two vertices. In FIG. 6(b), the deletion of edge (b) does not affect any MUCs (Line 20 in Algorithm 2).

(c) An existing MUC is split into MUC(s) and vertex(s), after the deletion, if there still exists more than one path between two vertices and exists a vertex appearing in all paths between the two vertices. In FIG. 6(b), the deletion of edge (c) induces the separation of MUC into two MUCs (Line 18 in Algorithm 2).

Next, the step of extracting an MUC ($MUC_U$) containing an updated vertex and calculating the betweenness centrality (i.e., local betweenness centrality) due to the shortest paths (i.e., internal paths) in the $MUC_U$ (S20) will be described.

That is, a method for computing the betweenness centrality values will be described. As mentioned in Step S10, after an insertion or deletion of the edge e($v_i$, $v_j$), it is guaranteed that the betweenness centralities of vertices in MUC($v_i$) can be changed. Therefore, after finding the reduced set of vertices, which is referred to as MUC, it is necessary to efficiently calculate and update the betweenness centralities of the vertices in the MUC to which the updated vertices belong. From now on, such an MUC will be denoted simply as an $MUC_U$.

An MUC (hereinafter referred as an $MUC_U$) containing a vertex (hereinafter referred as an updated vertex) which is to an updated edge is extracted (S20). The MUC updated in the step of obtaining the MUC of the updated graph (S10) corresponds to the $MUC_U$. However, if the MUC is destructed by the deletion of the updated edge (i.e., by the deletion of edge (a) in FIG. 6b), it is preferred to determine the MUC containing the updated edge of the graph before update as the $MUC_U$.

For reference, there are several MUCs in the updated graph obtained in Step S10, and the MUC related to the update is called the $MUC_U$.

Then, the betweenness centrality (i.e., local betweenness centrality) due to the shortest paths (i.e., internal paths) in the $MUC_U$ is calculated (S20). If all the edges in the shortest paths are included in the $MUC_U$, such shortest paths are called the internal paths. Moreover, the betweenness centrality due to the internal paths is called the location betweenness centrality. That is, the $MUC_U$ is regarded as a graph, and the betweenness centrality is obtained using the local betweenness centrality by Formula 1.

This may be summarized by the following Formula 1A.

Vertices $v_i$, $v_j$, $v_k$ in Formula 1 are the vertices of the set V of vertices, while vertices $v_i$, $v_j$, $v_k$ in Formula 1A cover only the vertices in the MUC containing updated vertices, i.e., the $MUC_U$.

$$c_{MUC}(v_i) = \sum_{j,k} \frac{\sigma_{v_j,v_k}(v_i)}{\sigma_{v_j,v_k}} \quad \text{[Formula 1A]}$$

where $v_i$, $v_j$, $v_k \in MUC_U$, $i \neq j \neq k$, $\sigma_{vi,vk}(v_j)$ is the number of shortest paths (internal paths) between $v_i$ and $v_k$ that include $v_j$, and $\sigma_{vi,vk}$ is the number of internal paths between $v_i$ and $v_k$.

The betweenness centrality (i.e., local betweenness centrality) only on the vertices of the $MUC_U$ with respect the updated graph is recomputed, however, since the number of vertices of the $MUC_U$ is smaller than the number of vertices in the entire graph (i.e., updated graph), the computation time is very short.

Next, the step of obtaining the betweenness centrality (i.e., an increase of the external path) due to external paths of the $MUC_U$ (S30) will be described. The betweenness centrality (hereinafter referred to as an increase of the external path) due to the shortest paths (hereinafter referred as external paths) of the graph, which are not included in the $MUC_U$ is obtained (S30). The external paths of $MUC_U$ refer to the shortest paths, in which a part of shortest paths of the graph exists in $MUC_U$ and the other exists in the graph other than $MUC_U$.

In the previous steps, the method for finding the set ($MUC_U$) of vertices whose betweenness centralities are changed by the insertion or deletion of an edge and the method for obtaining the betweenness centrality (i.e., local betweenness centrality) using only the vertices in $MUC_U$ have been described. However, the calculation of the betweenness centrality using only the vertices in $MUC_U$ is insufficient. In fact, the betweenness centralities (i.e., local betweenness centrality) calculated using only the vertices in $MUC_U$ are always smaller than the betweenness centralities (i.e., global betweenness centrality) calculated using all the vertices in a graph.

This is because, (1) the shortest paths whose source or target is not in the $MUC_U$ and (2) the shortest paths that pass though the $MUC_U$ and both the source and the target of the shortest paths are not in the $MUC_U$, are not yet considered.

Figure 8:
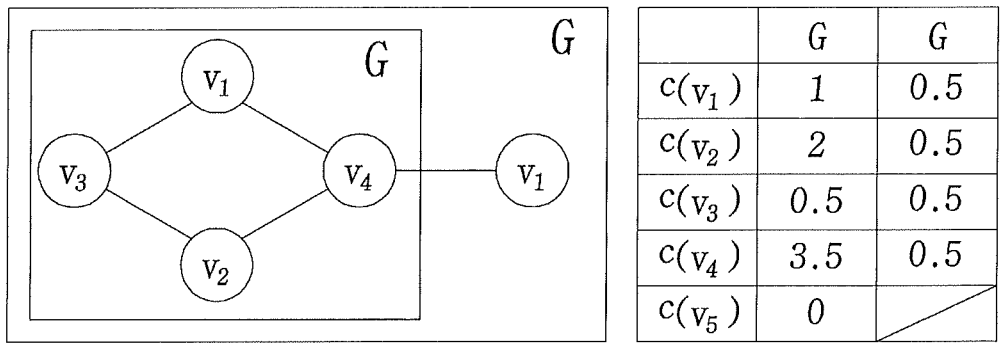
FIG. 8 is an example of the dependency of betweenness centrality in accordance with the present invention.

For example, FIG. 8 shows the betweenness centralities of the vertices in G, and a subgraph of G, G'. Let G', a subgraph of G, be $MUC_U$, then the local betweenness centralities of vertices calculated using only the vertices in G' ($MUC_U$) are smaller than the values of the global betweenness centralities calculated using all the vertices in G.

Based on this idea, if the betweenness centrality calculated using only the vertices in the $MUC_U$ is referred to as the local betweenness centrality and the betweenness centrality calculated using the entire vertices in the graph is referred to as the global betweenness centrality, a method for restoring the global betweenness centrality using only the cardinality of the sets of vertices whose betweenness centralities do not change (the sets of MUCs other than the $MUC_U$) will be described.

In detail, a first increase of the external path due to the external paths whose source or target is in the $MUC_U$ and a second increase of the external path due to the external paths whose source and target pass through the $MUC_U$ but are all not in the $MUC_U$ are obtained.

Moreover, the second increase of the external path comprises an increase (hereinafter referred to as a second-first increase of the external path) in which a subgraph of connection vertices of the $MUC_U$ containing the source or target is not disconnected and an increase (hereinafter referred to as a second-second increase of the external path) in which the subgraph is disconnected.

Prior to the introduction of this step (S30), some terminologies will be defined for a better understanding of the present invention. cMUC($v_i$) denotes the local betweenness centrality of a vertex $v_i$ calculated using the vertices in the $MUC_U$ only. σρ($v_i$, $v_j$) is the set of vertices in the shortest paths between $v_i$ and $v_j$. For example, in FIG. 8, σρ($v_1$, $v_2$) is {$V_1$, $v_2$, $v_3$, $V_4$}.

$G_j$ represents a disconnected subgraph originated from the deletion of the connection vertex, represents $c_j$. $G^l_j$ the $l^{th}$ connected component of $G_j$. $V_{Gj}$ is the set of vertices of $G_j$.

In FIG. 9, $G_1$, $G_2$ and $G_3$ represent disconnected subgraphs originated from the deletions of connection vertices, $v_1$, $v_2$, and $v_3$, respectively. $G_2^1$ and $G_2^2$ are connected subgraphs of $G_2$. If the dotted edge is inserted, the $MUC_U$ is $\{v_1, v_2, v_3, v_4\}$, and connection vertices of the $MUC_U$ to $G_1$, $G_2$ and $G_3$ are $v_1$, $v_2$, and $v_3$, respectively. FIG. 9 is an example of updating the betweenness centrality in which vertices in $G_1$ and $G_3$ are omitted.

[Lemma 1] Let $v_s \in VG_j$, $v_t \in MUC_U$ and $c_j$ be a connection vertex which connects $MUC_U$ with $G_j$. Then, each vertex in $\sigma\rho(c_j, v_t)$ must be included in a $\sigma\rho(v_s, v_t)$.

Proof: Since a connection vertex in $MUC_U$ is also an articulation vertex, all paths from $vs \in V_{Gj}$ to $v_t \in MUC_U$ go through a connection vertex $c_j$. Therefore $\sigma\rho(v_s, v_t)$ always includes $\sigma\rho(c_j, v_t)$.

Lemma 1 enables to calculate the increase of the betweenness centrality due to the shortest paths whose source or target is not in the $MUC_U$ (the shortest paths between the vertices in the $MUC_U$ and the vertices not in the $MUC_U$).

Such increase of the betweenness centrality for $v_i$ due to the shortest path $(v_s, v_t)$ is denoted as $c_{bj}(v_i)$.

$$c_{b_j}(v_i) = |V_{G_j}| \cdot \sum_k \frac{\sigma_{v_j,v_k}(v_i)}{\sigma_{v_j,v_k}} \quad \text{[Formula 2]}$$

where $v_i$, $v_j$, $v_k \in MUC_U$, $i \neq k$, $j \neq k$, $v_j$ is a connection vertex to $G_j$, $V_{Gj}$ is a set of vertices of subgraph $G_j$ connected to a connection vertex $v_j$, and $|V_{Gj}|$ is the cardinality of the set of vertices of subgraph $G_j$.

[Lemma 2.] Let $v_s \in V_{Gj}$, $v_t \in V_{Gk}$, and $c_j$ and $c_k$ be connection vertices which connect MUCU with $G_j$, and MUCU with $G_k$, respectively. Then each vertex in $\sigma\rho(c_j, c_k)$ must be included in a $\sigma\rho(v_s, v_t)$.

Proof: Since $c_j$ and $c_k$ are articulation vertices, all paths from $v_s \in V_{Gj}$ to $v_t \in V_{Gk}$ go through connection vertices $c_j$ and $c_k$. Therefore $\sigma\rho(vs, v_t)$ always includes $\sigma\rho(c_j, c_k)$.

Lemma 2 enables to calculate the increase of the betweenness centrality due to the shortest paths that pass through the $MUC_U$ and whose source and target are both not in the MUCU.

Such increase of the betweenness centrality for $v_i$ due to the shortest path $(v_s, v_t)$ is denoted as $\overline{c_{t_j^k}(v_i)}$.

$$c_{t_j^k}(v_i) = |V_{G_j}| \cdot |V_{G_k}| \cdot \frac{\sigma_{v_j,v_k}(v_i)}{\sigma_{v_j,v_k}} \quad \text{[Formula 3]}$$

where $v_i$, $v_j$, $v_k \in MUC_U$, $j \neq k$, $v_j$ and $v_k$ are connection vertices to $G_j$ and $G_k$, $V_{Gj}$ and $V_{Gk}$ are sets of vertices of subgraphs $G_j$ and $G_k$ connected to connection vertices $v_j$ and $v_k$, and $|V_{Gj}|$ and $|V_{Gk}|$ are the cardinalities of the sets of vertices of subgraphs $G_j$ and $G_k$.

In the example of FIG. 9, the connected subgraph to connection vertex $v_3$ is $G_3$, the set of vertices of $G_3$ is $V_{G3}$, and its cardinality $|V_{Gj}|$ is 6.

In the case where $G_i$ is disconnected, all shortest paths between the two vertices from different connected components of $G_i$ always pass through $v_i$. For example, in FIG. 9, a shortest path from $v_s \in G_2^1$ to $vt \in G_2^2$ must pass through $v_2$.

Such an increase of the betweenness centrality (or the second-second increase of the external path) for $v_i$ is denoted as $c_{ti}(v_i)$ and calculated as follows:

$$c_{t_i}(v_i) = \begin{cases} |V_{G_i}|^2 - \sum_{l=1}^{n}(|V_{G_i^l}|^2) & \text{if } G_i \text{ is disconnected} \\ 0 & \text{otherwise} \end{cases} \quad \text{[Formula 4]}$$

where $G^l_j$ is the $l^{th}$ connected component of $G_i$, n is the number of connected components in $G_i$, and $v_i$ is the connection vertex to $G_i$.

[Theorem 1] Betweenness Centrality Update Theorem

By Lemma 1 and Lemma 2, the betweenness centrality of a vertex $v_i$, $c(v_i)$ can be computed.

$$c(v_i) = \quad \text{[Formula 5]}$$
$$c_{MUC}(v_i) + \sum_{G_j \subset G} c_{b_j}(v_i) + \sum_{G_j, G_k \subset G, j \neq k} c_{t_j^k}(v_i) + \sum_{G_i \subset G} c_{t_i}(v_i)$$

where $c_{MUC}(v_i)$ is the local betweenness centrality value and calculated by Formula 1A, $c_{bi}(v_i)$ is from Formula 2 (Lemma 1), and $c_{t_j^k}(v_i), c_{t_i}(v_i)$ are from Formula 3 and Formula 4 (Lemma 2).

By Theorem 1, it is possible to compute the global betweenness centrality using the local betweenness centrality and the number of vertices in each disconnected subgraph Gi without performing all pair shortest paths computation on the all the vertices in a graph.

Next, the step of calculating the global betweenness centrality of $MUC_U$ (S40) will be described with reference to FIG. 10. FIG. 10 shows Algorithm 3 for updating the betweenness centrality.

The betweenness centrality (i.e., global betweenness centrality) of the graph is calculated by adding the increase of the external path to the local betweenness centrality (S40).

As shown in FIG. 10, Algorithm 3 shows how to update the betweenness centrality only using vertices in $MUC_U$ that updated vertices belong to. Algorithm 3 uses $MUC_U$ as an input and calculates the updated betweenness centrality ($C[v_i]$) as an output. The set of all pair shortest paths in $MUC_U$ and the local betweenness centralities of vertices in $MUC_U$ are calculated using the existing betweenness centrality algorithms (Line 4).

Then, for each shortest path between the vertices in MUCU (Line 5), add the increase of betweenness centrality values due to the shortest paths between the vertices in MUCU and the vertices in other subgraphs (Line 9), as well as the shortest paths between the vertices in two other subgraphs, which pass through MUCU (Line 13) and the shortest paths between the two vertices from different connected components of a subgraph (Line 15). Note that it does not require additional costs to obtain $$\frac{\sigma_{v_j,v_k}(v_i)}{\sigma_{v_j,v_k}}$$

shown in Line 10 and Line 13, since all pair shortest paths are already calculated when the local betweenness centrality is computed (Line 4) and can be easily obtained.

FIG. 11 shows the values calculated using Formula 1A, Formula 2, Formula 3, and Formula 4 for the vertices in $MUC_U$ shown in FIG. 9. Due to the space limitation, a path from $v_s$ to $v_t$ and a path from $v_t$ to $v_s$ are not differentiated in this example. Therefore, the actual betweenness centralities are twice as big as the values shown in this example.

For example, for vertex v2, the local betweenness centrality, $cMUC(v_2)$, is 0. And the increase of the shortest path which ends at a vertex of subgraph $G_2$ among the shortest path including $v_2$ is 12 by multiplying 4 which is the cardinality of $V_{G2}$ by 3 which the value of $$\sum_{k=1,3,4} \frac{\sigma_{v_2,v_k}(v_2)}{\sigma_{v_2,v_k}}$$

based on Formula 2.

Moreover, the increase of the shortest path having the vertices of subgraphs $G_1$ and G2 at both ends among the shortest paths including $v_2$ is 20 by multiplying "$|V_{G1}| \cdot |V_{G2}|=5 \cdot 4$" by 1 which is the value of $$\frac{\sigma_{v_1,v_2}(v_2)}{\sigma_{v_1,v_2}}$$

based on Formula 3. Likewise, the increase of the shortest path containing $v_2$ and having the vertices of subgraphs $G_1$ and G2 at both ends is 24.

Additionally, $G_2$ is a disconnected graph and $v_2$ is a connection vertex to $G_2$. Therefore, "$4^2-(3^2+1^2)=6$" is added as the increase based on Formula 4 (the path from $v_s$ to $v_t$ and a path from $v_t$ to $v_s$ are not differentiated in this example, and thus 3 which is half of 6 is added).

Finally, "0+12+20+24+3=59" is obtained as the global betweenness centrality which is the same value resulting from the calculation of the betweenness centrality of $v_2$ using all the vertices in the original graph. The betweenness centrality values for the other vertices $v_t$, $v_3$ and $v_4$ can also be calculated in the same way as the case of $v_2$.

Next, an experimental example for implementing the method for updating the betweenness centrality of the graph in accordance with the present invention updating and its results will be described in more detail.

A method for implementing an updatable version of the Brandes' algorithm using a Quick algorithm for Updating BEtweenness centrality (QUBE) of the present invention will be described based on the Brandes' algorithm. Moreover, this updatable version of the Brandes' algorithm will be compared with the original Brandes' algorithm and the degree of improvement achieved with the help of the QUBE according to the present invention will be described. Recall that all previous betweenness centrality calculation algorithms, which do not consider the graph update, such as the Brandes' algorithm, inevitably require the computation of the betweenness centrality from scratch whenever a graph changes. The experiments are conducted on Intel Xeon CPU with 2.53 GHz and 20 GB main memory.

As explained in Algorithm 3, the QUBE can be applied to any betweenness centrality calculation algorithm since it reduces the search space by identifying the candidate vertices and restores the global betweenness centrality using the local betweenness centrality. Since the Brandes' algorithm is known to be the fastest algorithm so far for computing the exact betweenness centrality, the QUBE is implemented based on the Brandes' algorithm.

The Brandes' algorithm computes one-sided pair dependencies of all the vertices in a graph for a given source vertex by solving a single source shortest path problem. The one-sided pair dependency of a vertex $v_t$ is the number of all shortest paths that go through $v_t$, where the start vertex of the paths is fixed to a specific vertex $v_s$. A detailed description of the Brandes' algorithm can be found in [literature 5].

As mentioned above, in addition to the local betweenness centrality (Formula 1A), it is necessary to calculate (1) the increase of the betweenness centrality (Formula 2) due to the shortest paths whose source or target is a connection vertex, and (2) the increase of the betweenness centrality (Formula 3 and Formula 4) due to the shortest paths whose source and target are both connection vertices.

Since the Brandes' algorithm does not explicitly calculate the all pair shortest paths, the necessary values for the calculation of (1) and (2) are obtained during the computation of the one-sided pair dependencies on the Brandes' algorithm. The detailed implementation of the updatable version of the Brandes' algorithm using the QUBE is shown in Algorithm 4 of FIG. 12. The additional increases in the betweenness centrality explained through Formula 2, Formula 3, and Formula 4 are computed in (Line 34), (Lines 23 to 26 and Lines 29 to 31), and (Line 38), respectively. The additional lines added to the original Brandes' algorithm are underlined.

Next, the effects of the present invention will be described.

To evaluate the proposed algorithm, the betweenness centrality update time is measured using synthetic datasets and real datasets. Connected, undirected, and unweighted graphs of varying numbers of vertices and edges are synthetically generated in order to observe the performance with respect to the graph size and proportions.

The proportion is computed as $(|MUC_U|/|V|) \cdot 100$, and it indicates the percentage of vertices whose betweenness centralities should be recalculated due to the update of the graph and is the same as the number of vertices considered when the local betweenness centrality is computed. Therefore, it mainly affects the performance of the QUBE. The Erdös-Rényi model [literature 9], the most widely used random graph model, is used to generate synthetic graphs. Each edge in the graph is generated independently of existing edges, with an equal probability of being generated.

FIG. 13 shows the running time for updating the betweenness centrality on synthetic graphs of size 1,000, 3,000, and 5,000, respectively. For each graph, 100 edges are randomly inserted and the average value is taken. The QUBE significantly reduces the betweenness centrality update time as the proportion decreases.

In FIG. 13(c), when the proportions are 80, 40, and 10, the QUBE enables the original Brandes' algorithm to perform about 2, 13, and 623 times faster, respectively. These results provide a clear evidence that finding the $MUC_U$ dramatically improves the performance of updating the betweenness centrality. Regardless of the size of a graph, the QUBE makes the original Brandes' algorithm perform much faster.

Besides the update time of the betweenness centrality, the update of MUCs calculated during the preprocessing time is needed as the graph is updated. However, the update time of MUCs is negligible compared to the overall processing time, and thus the present invention does not explicitly present the update time of MUCs.

In order to estimate how the QUBE performs in real world graphs, various real datasets which are prone to frequent changes are selected. For each real graph, the maximally connected subgraph is extracted. In cases of directed real graphs, directed edges are converted into undirected edges. The betweenness centrality update time over 8 different real datasets is compared.

The results are shown in FIGS. 14 and 15. FIG. 14 shows the speed-up achieved by the QUBE and the overall statistics of each real dataset. Recall that the proportion is the percentage of vertices in MUC. The low proportion means that there exist a small number of vertices whose betweenness centralities can be changed. Speed up in FIG. 14 shows how fast the updatable version of the Brandes' algorithm is compared to the original Brandes' algorithm. FIG. 14 clearly shows that the performance of the updatable version of the Brandes' algorithm increases as the proportion decreases.

FIG. 15 shows the average betweenness centrality update times measured on real graphs. Note that a log scale for the y-axis in FIG. 15 is used. To represent the precise update time, a table is included in FIG. 15. The QUBE makes the original Brandes' algorithm perform about 2 times faster on 'CAGrQc' dataset whose proportion is about 77 and perform about 2,418 times faster on 'Eva' dataset whose proportion is about 6. When the proportion is about 30, the QUBE makes the original Brandes' algorithm perform about 37 times faster and when the proportion is about 70, the QUBE makes the original Brandes' algorithm perform about 3 times faster.

The present invention provides a betweenness centrality update theorem and proposes an efficient algorithm (QUBE) based on this theorem. The QUBE identifies a set of vertices whose betweenness centralities can be changed. The QUBE efficiently updates the betweenness centralities based on the betweenness centrality calculated using the vertices in the set only and the number of vertices not in the set.

Any existing betweenness centrality algorithm which does not consider the graph update can be changed to an efficient updatable betweenness centrality algorithm with an adoption of QUBE. The present invention implements an updatable version of the Brandes' algorithm by adopting QUBE. For the synthetic graphs whose proportions are 10, the Brandes' algorithm with QUBE is about 557 times faster compared to the original Brandes' algorithm. For the real graphs whose proportions are about 30, the Brandes' algorithm with QUBE performs about 37 times faster than the original Brandes' algorithm. The performance improvement becomes even larger when the proportion decreases.

Next, a system for updating betweenness centrality of a graph in accordance with another exemplary embodiment of the present invention will be described with reference to FIG. 16.

As mentioned above, the method for the updating betweenness centrality of the graph in accordance with the present invention may be implemented as a program system, and each step of the method may be implemented as a single functional means.

The betweenness centrality update system 30 is a system that obtains the betweenness centrality of an unweighted graph (i.e., an original graph), which comprises vertices and edges with no weights and is updated (i.e., an updated graph) when an edge is updated (i.e., an updated edge).

Figure 16:
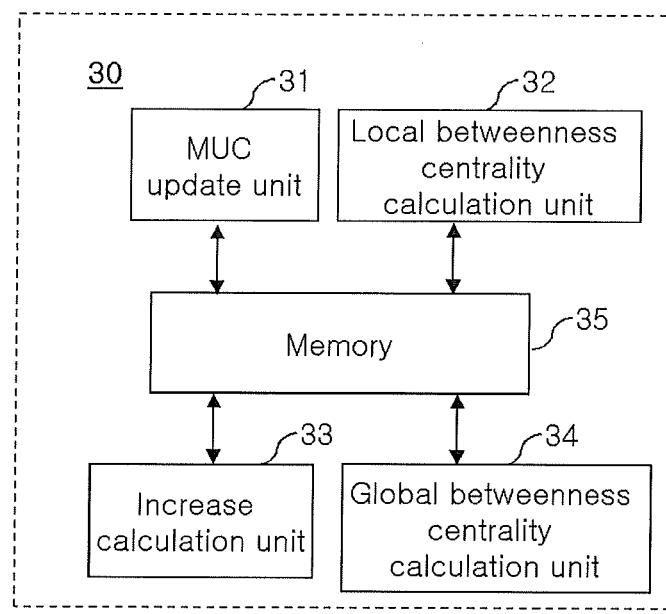
FIG. 16 is a block diagram showing the configuration of a system for updating betweenness centrality of a graph in accordance with another exemplary embodiment of the present invention.

As shown in FIG. 16, the system for updating the betweenness centrality of the graph in accordance with another exemplary embodiment of the present invention comprises: an MUC update unit 31 which obtains a minimum union cycle (MUC) from the updated graph, a local betweenness centrality calculation unit 32 which extracts an MUC ($MUC_U$) containing a vertex (i.e., updated vertex) which is to the updated edge and calculates the betweenness centrality (i.e., local betweenness centrality) due to the shortest paths (i.e., internal paths) in the $MUC_U$, an increase calculation unit 33 which obtains the betweenness centrality (i.e., an increase of an external path) due to the shortest paths (i.e., external paths) of the graph, which are not included in the $MUC_U$, and a global betweenness centrality calculation unit 34 which calculates the betweenness centrality (i.e., global betweenness centrality) of the graph by adding the increase of the external path to the local betweenness centrality.

As described above, according to the method for the updating betweenness centrality of the graph in accordance with the present invention, it is possible to effectively reduce the search space and significantly reduce the cost of calculation by finding a candidate set of vertices whose betweenness centralities can be updated and computing their betweenness centralities using candidate vertices only.

In more detail, the present invention provides the following effects.

1. It is possible to provide a method that can identify a set of vertices whose betweenness centralities can be updated and sets of vertices whose betweenness centralities do not change, based on the comprehensive analysis of changes in the betweenness centrality when a graph is updated.

2. It is possible to provide a Betweenness Centrality Update Theorem. The theorem enables an efficient update of betweenness centrality without traversing the entire graph. Based on the proposed theorem, it is possible to provide an efficient algorithm for updating betweenness centrality.

3. Experiments are conducted on various synthetic datasets as well as large real datasets. The experimental results show that the incorporation of the algorithm according to the present invention outperforms an existing algorithm, in updating the betweenness centrality. In cases where the size of the reduced set of vertices is 1/10 of the number of vertices in the synthetic graphs, the proposed algorithm speeds up the existing algorithm 577 times on the average. For real datasets, the proposed algorithm speeds up the existing algorithm 2 to 2,418 times depending on the dataset.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A computer-implemented method for updating betweenness centrality of a graph, which obtains the betweenness centrality of an unweighted graph (hereinafter referred to as an original graph), which comprises vertices and edges with no weights and is updated (hereinafter referred to as an updated graph) when an edge is updated (hereinafter referred to as an updated edge), the computer-implemented method comprising executing on a computer the steps of:

(a) the computer obtaining a minimum union cycle (hereinafter referred to as an MUC) of the updated graph;

(b) the computer extracting an MUC (hereinafter referred to as an $MUC_U$) containing a vertex, which is incident to the updated edge, and calculating the betweenness centrality (hereinafter referred to as local betweenness centrality) due to the shortest paths (hereinafter referred to as internal paths) in the $MUC_U$;

(c) the computer obtaining the betweenness centrality (i.e., an increase of an external path) due to the shortest paths (hereinafter referred to as external paths) of the graph, which are not included in the $MUC_U$; and (d) the computer calculating the betweenness centrality (hereinafter referred to as global betweenness centrality)

of the graph by adding the increase of the external path to the local betweenness centrality, wherein the MUC is a subset (hereinafter referred to as a cycle) of edges of the graph, in which every vertex of the graph is incident to an even number of edges, and is obtained by summing up the cycles of the set of vertices having the minimum total weight (i.e., a minimum cycle basis) among the maximal set of linearly independent cycles (i.e., a cycle basis), in step (c), a first increase of the external path due to the external paths whose source or target is in the $MUC_U$ and a second increase of the external path due to the external paths whose source and target pass through the $MUC_U$ but are all not in the $MUC_U$ are obtained, and the first increase of the external path $c_{b_j}(v_i)$ is obtained by the following Formula 1:

$$c_{b_j}(v_i) = |V_{G_j}| \cdot \sum_k \frac{\sigma_{v_j,v_k}(v_i)}{\sigma_{v_j,v_k}} \quad [\text{Formula 1}]$$

where $v_i, v_j, v_k \in MUC_U$, $i \neq k$, $j \neq k$, $v_i$ is a connection vertex to $G_j$, $V_{G_j}$ is a set of vertices of subgraph $G_j$ connected to a connection vertex $v_i$, and $|V_{G_j}|$ is the cardinality of the set of vertices of subgraph $G_j$.

2. The computer-implemented method of claim 1, wherein in step (a), the MUC of the updated graph is obtained by updating only the MUC containing the updated vertex among the MUCs of the original graph.

3. The computer-implemented method of claim 2, wherein in step (a), if the updated vertex of the updated edge to be inserted belongs to the same MUC (hereinafter referred to as an MUC to be inserted), the MUC is updated by inserting the updated edge into only the MUC to be inserted and, if the updated vertex does not belong to the same MUC, the MUC is updated by obtaining the MUC containing the shortest path between the updated vertices, including the obtained MUC in the MUC of the original graph, and removing the MUC of the original graph containing the updated vertices.

4. The computer-implemented method of claim 2, wherein in step (a), if the number of shortest paths between the updated vertices of the updated edge to be deleted is one, the MUC is updated by removing the MUC containing the updated vertices from the original graph, if the number of shortest paths is at least two and there exists at least one vertex appearing in all the paths between the updated vertices, the MUC of the original graph is disconnected, and if there does not exist the at least one vertex, the MUC is updated by removing the updated edge.

5. The computer-implemented method of claim 1, wherein the second increase of the external path comprises an increase (hereinafter referred to as a second-first increase of the external path) in which a subgraph of connection vertices of the $MUC_U$ containing the source or target is not disconnected and an increase (hereinafter referred to as a second-second increase of the external path) in which the subgraph is disconnected.

6. The computer-implemented method of claim 5, wherein the second-first increase of betweenness centrality $\overline{c_{t_j^k}(v_i)}$ and the second-second increases of betweenness centrality $c_{t_i}(v_i)$ are calculated by the following Formula 2 and Formula 3:

$$c_{t_j^k}(v_i) = |V_{G_j}| \cdot |V_{G_k}| \cdot \frac{\sigma_{v_j,v_k}(v_i)}{\sigma_{v_j,v_k}} \quad [\text{Formula 2}]$$

where $v_i, v_j, v_k \in MUC_U$, $j \neq k$, $v_j$ and $v_k$ are connection vertices to $G_j$ and $G_k$, $V_{G_j}$ and $V_{G_k}$ are sets of vertices of subgraphs $G_j$ and $G_k$ connected to connection vertices $v_j$ and $v_k$, and $|V_{G_j}|$ and $|V_{G_k}|$ are the cardinalities of the sets of vertices of subgraphs $G_j$ and $G_k$; and $$c_{t_i}(v_i) = \begin{cases} |V_{G_i}|^2 - \sum_{l=1}^{n}(|V_{G_i^l}|^2) & \text{if } G_i \text{ is disconnected} \\ 0 & \text{otherwise} \end{cases} \quad [\text{Formula 3}]$$

where $G_j^l$ is the $l^{th}$ connected component of $G_i$, n is the number of connected components in $G_i$, and $v_i$ is the connection vertex to $G_i$.

* * * * *